United States Patent [19]

Branson

[11] Patent Number: 4,819,164
[45] Date of Patent: Apr. 4, 1989

[54] VARIABLE FREQUENCY MICROPROCESSOR CLOCK GENERATOR

[75] Inventor: Charles N. Branson, Lubbock, Tex.

[73] Assignee: Texas Instruments Incorporated, Dallas, Tex.

[21] Appl. No.: 560,476

[22] Filed: Dec. 12, 1983

[51] Int. Cl.⁴ .............................................. G06F 1/04
[52] U.S. Cl. ................................................... 364/200
[58] Field of Search ... 364/200 MS File, 900 MS File; 328/62, 63; 377/114

[56] References Cited

U.S. PATENT DOCUMENTS

| | | | |
|---|---|---|---|
| 3,941,989 | 3/1976 | McLaughlin | 364/900 |
| 3,950,735 | 4/1976 | Patel | 364/200 |
| 4,037,090 | 7/1977 | Raymond | 364/200 X |
| 4,050,096 | 9/1977 | Bennett et al. | 364/200 |
| 4,172,281 | 10/1979 | Gordon | 364/200 |
| 4,191,998 | 3/1980 | Carmody | 364/200 |
| 4,217,637 | 8/1980 | Faulkner et al. | 364/200 |
| 4,223,380 | 9/1980 | Antonaccio et al. | 364/200 |
| 4,241,418 | 12/1980 | Stanley | 364/900 |
| 4,254,475 | 3/1981 | Cooney et al. | 364/900 |
| 4,314,334 | 2/1982 | Daughton | 364/200 |
| 4,366,540 | 12/1982 | Berglund et al. | 364/200 |
| 4,394,736 | 7/1983 | Bernstein et al. | 364/200 |
| 4,398,246 | 8/1983 | Frediani et al. | 364/200 |
| 4,413,350 | 11/1983 | Bond et al. | 377/114 X |
| 4,435,757 | 3/1984 | Pross, Jr. | 364/200 |
| 4,446,517 | 5/1984 | Katsura et al. | 364/200 |
| 4,447,870 | 5/1984 | Tague et al. | 364/200 |
| 4,458,308 | 7/1984 | Holtey et al. | 364/200 |
| 4,484,263 | 11/1984 | Olson et al. | 364/200 |
| 4,507,783 | 3/1985 | Austin et al. | 371/49 |
| 4,509,120 | 2/1985 | Daudelin | 364/200 |
| 4,571,674 | 2/1986 | Hartung | 364/200 |
| 4,575,794 | 3/1986 | Veneski | 364/200 |
| 4,575,848 | 3/1986 | Moore | 364/200 |
| 4,608,706 | 8/1986 | Chang et al. | 377/114 X |

Primary Examiner—Raulfe B. Zache
Assistant Examiner—Florin Munteanu
Attorney, Agent, or Firm—William E. Hiller; N. Rhys Merrett; Melvin Sharp

[57] ABSTRACT

A microprocessor based system (10) includes a central processing unit (CPU) (12) that controls the operation of a display (20) through a controller (22). System storage is provided with a read only memory (16) and random access memory (14). A reference clock signal is generated by a clock generator (26) which is input to a clock control circuit (24). The control circuit (24) generates a CLK signal that is connected to the clock input of the CPU (12). The control circuit (24) is operable to reduce the rate of the clock input to the CPU (12) when accessing the controller (22) which has a slower speed of operation than the random access memory (14). The control circuit (24) includes a programmable counter (38) for generating a gating signal after counting a predetermined number of cycles of the reference clock signal and initiating a count cycle only after generation of the gating signal. Generation of the gating signal by the counter (38) causes a latch circuit (68) to become transparent during selected transitions of the CLK signal. The control circuit (24) also provides for overriding the programmable counter (38) via an event counter circuit (56) which is effective to generate the gating signal independently of the programmable counter (38) after counting a predetermined number of count cycles of the programmable counter (38). The control circuit (24) is thereby effective to reduce the rate of the CLK signal as input to the CPU (12) and to retain the reduced rate of the CLK signal for a time period sufficient for the CPU (12) to access peripheral devices of low operating speed. Thus, the CPU (12) is able to control peripheral devices that have different maximum rates of operation.

12 Claims, 2 Drawing Sheets

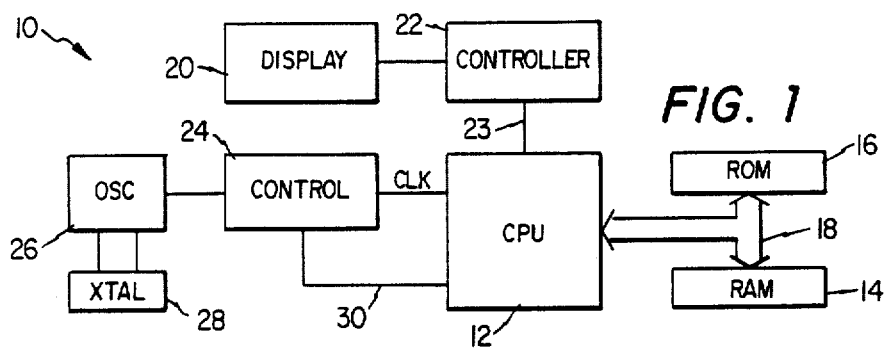
FIG. 1
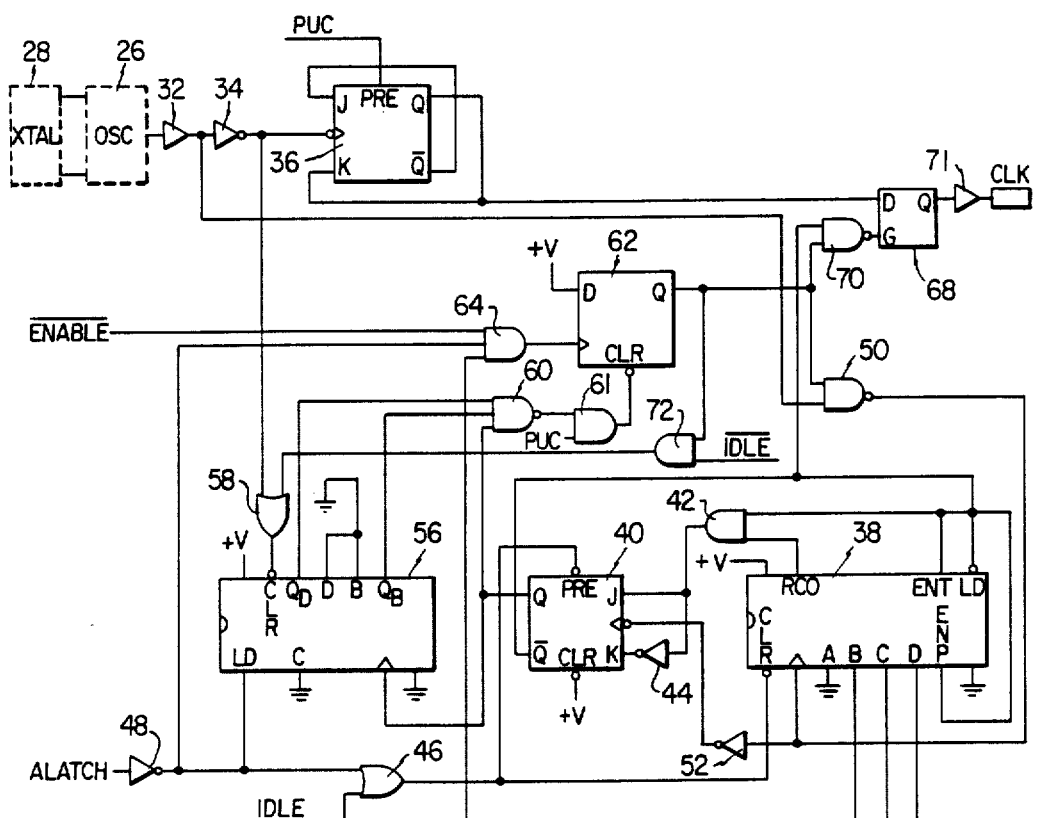
FIG. 2
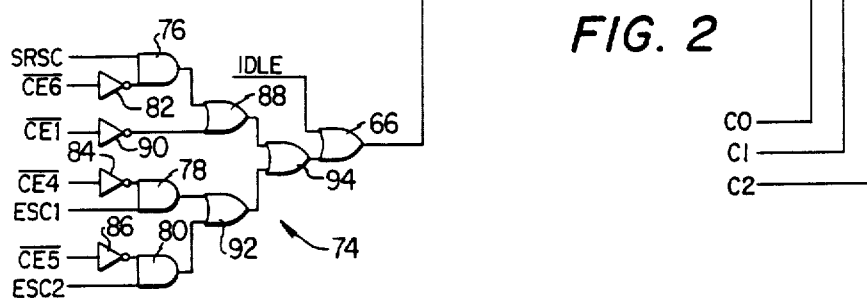

VARIABLE FREQUENCY MICROPROCESSOR CLOCK GENERATOR

TECHNICAL FIELD

The present invention pertains in general to microprocessor-based systems and, more particularly to interface circuits which allow a microprocessor to operate at different speeds depending upon the function performed.

BACKGROUND OF THE INVENTION

To achieve high operational rates with small computers and microprocessor-based devices, it has been necessary to develop higher speed microprocessors and the peripheral circuits such as random access memories (RAM), read only memories (ROM) or display drivers. When a high speed microprocessor is utilized, the associated peripheral devices must be compatible in order to be addressed by the microprocessor. Normally, microprocessors address a peripheral device in one cycle of the microprocessor clock and then sample the response from the sampled peripheral device in the next clock cycle. This is a disadvantage in that the increased speed of the microprocessor requires that all of the peripheral devices must operate at the same high speed.

Although the use of high speed microprocessors and high speed associated peripheral devices results in higher operational speeds for certain functions, it also generally results in increased equipment costs. If the particular application requires high speed access to the information stored in RAM, this cost must be tolerated. However, there are some functions of a microprocessorbased device that do not necessarily have to be performed at high speed. Such operations include those that display information to a user. For example, it is desirable to perform computations very quickly, but the use of high speed display devices is often not necessary since the visual response of the operator is much slower than the rate at which the microprocessor can effect a display change. Therefore, it would be desirable to utilize a slower and less expensive peripheral device to provide the display function of the microprocessor-based device. However, since the response time or speed of the display is dictated by the speed and type of microprocessor used, the use of a lower speed and thus lower cost display is not normally possible.

One previous solution to this problem has been to introduce a wait or hold mode of operation into the microprocessor. In this mode, the microprocessor continues to operate at its maximum clock speed, but allows the addressing signal to maintain a particular state for a predetermined number of clock cycles. This allows sufficient time for a relatively slower peripheral device to respond. One type of device that incorporates this mode of operation is an 8086 Microprocessor manufactured by Intel Corp. However, this wait or hold operating mode is not universally available, thus requiring the use of a particular microprocessor which can substantially increase the cost of the microprocessorbased device.

In view of the above disadvantages, there exists a need for a microprocessor-based system that is of sufficient versatility to utilize both slower and less expensive peripheral devices and the more expensive high speed peripheral devices.

SUMMARY OF THE INVENTION

The present invention disclosed and claimed herein includes a microprocessor-based system with a central microprocessor controlling the system. An oscillator circuit is provided for generating a reference frequency signal with a fixed rate. A control circuit divides the frequency of the reference frequency signal to provide a normal clock signal with a reduced frequency rate as compared to the frequency rate of the reference frequency signal. The control circuit is effective to selectively clock the central microprocessor at the frequency of the normal clock signal or at a frequency lower than the normal clock signal. This allows the execution speed of the central microprocessor to vary depending upon the particular system function to be controlled.

In an alternate embodiment of the present invention, the central processor controls the operation of the control circuit such that operating software of the central microprocessor can be utilized to select the clocking rate of the central microprocessor. In addition, the control circuit is programmable to determine the rate at which the microprocessor is to be clocked.

In yet another embodiment of the present invention, the duration over which the microprocessor is operated at a slower speed is preset. This preset duration allows the microprocessor to return to the high rate (i.e. the frequency rate of the normal clock signal) after allowing sufficient time to perform the particular system function at the slower rate. This duration is controlled by hardware attached to the control circuit.

In a further embodiment of the present invention, a method for controlling the central microprocessor in a microprocessor-based system is provided that includes generating a reference clock signal with a fixed rate to provide a reference rate for the system The frequency rate of the reference clock signal is then divided to provide a normal clock signal with a reduced frequency rate as compared to that of the reference clock signal. A clock rate reduction signal is then generated prior to accessing low operating speed peripheral devices that are attached to and controlled by the central microprocessor. After generation of the clock rate reduction signal, the rate of the normal clock signal input to the microprocessor is reduced. The reduced rate is allowed to remain for a predetermined duration of time sufficient for accessing of the low operating speed peripheral devices after which the rate is increased to the rate of the normal clock signal to allow addressing of the higher operating rate peripheral devices.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a block diagram of a system in accordance with the present invention;

FIG. 2 illustrates a schematic diagram of the interface circuit of the present invention.

DETAILED DESCRIPTION OF THE INVENTION

Figure 3A:
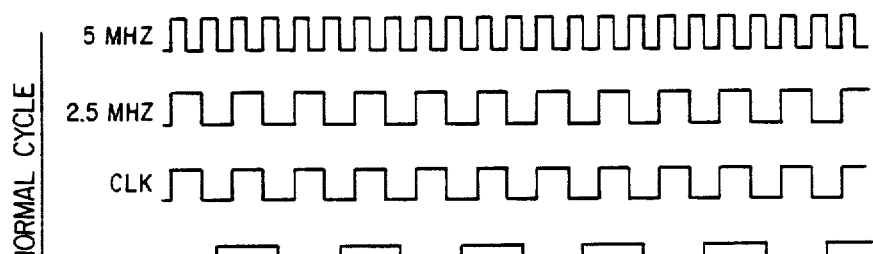
FIGS. 3a–c illustrate waveforms for various operations of the system of FIG. 1.

Referring now to FIG. 1, there is illustrated a block diagram of a microprocessor-based system 10 utilizing the interface circuit of the present invention. The system 10 includes a central processing unit (CPU) 12 that is connected to two external memories such as a random access memory (RAM) 14 and a read only memory (ROM) 16 through a bus 18. The system has a display 20 connected thereto through a controller 22. The controller 22 is connected to the CPU 12 through a control line 23. Since some form of digital data is generally transmitted to the controller 22 for input to the display, the controller is normally connected to a data bus. However, for simplicity purposes, this is not shown.

The clock input of the CPU 12 is labelled CLK and is connected to the output of a clock control circuit 24. The control circuit 24 is operable to divide the frequency of a clock generator circuit 26 which has a crystal 28 attached thereto as a frequency reference. The control circuit 24 parameters are adjustable in software by the CPU 12 through a set of interface lines 30 such that the CPU 12, in response to instructions stored in the RAM 14 or ROM 16, can control the frequency of the clock signal input on the CLK input. This control allows the CPU 12 to predetermine its own operating speed during accesses to low operating speed peripherals.

The CPU 12, in the preferred embodiment, may be chosen from the TMS 7000 Microprocessor family manufactured by Texas Instruments, Inc. The CPU 12 accesses the RAM 14 and the ROM 16 and the instructions stored therein to perform a desired function. These functions may range from simple calculations utilized in a calculator application to control of a machine based system. The CPU 12 operates by stepping through the stored instructions known as a program. Programs take a finite time to execute, due to the fact that each instruction must be read from memory which takes a finite number of clock cycles. Therefore, depending upon the type of program desired and the complexity thereof, the rate at which the program is executed is of prime importance in any microprocessor-based system.

To increase the rate of execution, high speed microprocessors are utilized to step through the instructions that form a particular program. This normally requires the use of high speed peripherals. In the preferred embodiment, a high speed RAM 14 is utilized of the type 6116 manufactured by Hitachi, Ltd. and a slow speed ROM 16 is utilized of the type 61256 also manufactured by Hitachi, Ltd. Use of a high speed RAM facilitates high speed READ/WRITE instructions from the CPU 12. This is important in that a large number of READ/WRITE instructions to a RAM are normally involved when executing a program as compared to the READ instructions to a ROM. Therefore, the speed of the CPU 12, which is dictated by the clock frequency input thereto, is limited by the response time of the RAM 14. Although a high speed ROM could be utilized in conjunction with the high speed RAM, cost trade offs in the preferred embodiment favor a slow speed ROM.

Although the speed with which computations are made and the execution speed of a program are important in microprocessor-based systems, this speed is not necessary in some functions such as displaying data and/or controlling machines. Since the expenses of the peripheral elements are directly related to their speed, it is desirable to use slower peripheral elements for control of the display and/or for control of machines. For example, to add two numbers together in a microprocessor-based calculator requires execution of a large number of commands stored in the internal memory. From an operator's standpoint, it is desirable to have these computations performed as quickly as possible and then displayed on the display. For the CPU 12 to effect a display of the final data, only a few instructions are required which are executed at a relatively fast rate. Since the operator response time is much slower than the response time of the display controller 22, it is not necessary to utilize a high speed display controller 22. However, if the CPU 12 utilizes a microprocessor that does not have an internal wait cycle, a high speed controller 22 must be used to facilitate proper interfacing with the display controller 22. Similarly, expensive high speed interface devices are often required to interface a high speed microprocessor with machines which also have a relatively slow response time.

In order to enable the use of lower speed peripheral elements such as a display controller for functions that do not require high speed execution, the control circuit 24 is utilized to reduce the clock frequency input to the CPU 12 and, therefore, the speed at which the CPU 12 operates the display controller 22 or other similar peripheral elements. In addition to reducing the speed of the CPU 12 when interfacing with slow speed peripheral elements, the control circuit 24 also functions to conserve power as a result of the reduction in speed when microprocessors utilizing CMOS technology are used.

Referring now to FIG. 2, there is illustrated a schematic diagram of the control circuit 24 with the clock generator circuit 26 and the associated crystal 28 attached thereto. The output of the clock generator 26 is input to a buffer circuit 32, the output of which is connected to the input of an inverter circuit 34. The output of the inverter circuit 34 is connected to the clock input of a J-K flip-flop 36. The flip-flop 36 has the J input thereof connected to the $\overline{Q}$ output thereof. The K input thereof is connected to the Q output thereof. In this configuration, the flip-flop 36 is operable to divide the clock frequency output by the inverter circuit 34 by a factor of two. In the preferred embodiment, the output frequency of the clock generator 26 is 5 MHz and the output frequency of the flip-flop 36 is 2.5 MHz.

A five bit counter is formed by combining a four bit programmable counter 38 and a J-K flip-flop 40. The counter 38 has the A data input thereof connected to ground and the B, C and D data inputs thereof connected to input lines C0, C1 and C2, respectively. The RIPPLE carry out (RCO) output of the counter 38 is connected to one input of an AND gate 42. The ENABLE T (ENT), the ENABLE P (ENP) and the load (LD) inputs are connected together to the other input of the AND gate 42. The output of the AND gate 42 is connected directly to the J input of the flip-flop 40 and to the K input thereof through an invertor 44. The CLEAR input of the counter 38 and the preset input of the flip-flop 40 are connected to the output of a OR gate 46. The load input of the counter 38 is connected to the $\overline{Q}$ output of the flip-flop 40.

One input of the OR gate 46 is connected to an ALATCH signal through an inverter 48 and the other input of the OR gate 46 is connected to an IDLE signal. The clock input of the counter 38 is connected to the output of a NAND gate 50 which has one input thereof connected to the output of the buffer 32 which is the 5 MHz signal from the clock generator 26. The clock input of the flip-flop 40 is also connected to the output of the NAND gate 50 through an inverter 52. When either the ALATCH signal or the IDLE signal is asserted, the registers in the counter 38 are cleared and the outputs of the flip-flop 40 are preset. The $\overline{Q}$ output of the flip-flop 40 is connected such that the load input of the counter 38 is activated to load the data on the CO–C2 signal lines when the flip-flop 40 is preset. When the ALATCH or IDLE signal is removed, the clock signal output from the NAND gate 50 is operable to clock the counter 38 to count from the preset number loaded into the data inputs thereof to a value of sixteen. The flip-flop 40 then provides one additional count to a value of seventeen at which time the Q output resets the counter 38 to the initial count number to begin the count cycle again.

The Q output of the flip-flop 40, which is the fifth bit of the five bit counter, is input to the clock input of a presettable binary counter 56. The clock input utilized on the counter/latch 56 is the "Clock 2" input. The counter 56 has the load (LD) input thereof connected to the output of the inverter 48 to receive the ALATCH signal, the clear (CLR) input thereof connected to the output of a OR gate 58 and the C, D and B data inputs thereof connected to ground. The $Q_B$ and $Q_D$ outputs are connected to two inputs of a three input NAND gate 60. The other input of the three input NAND gate 60 is connected to the Q output of the flip-flop 40. As configured, the counter 56 is a three-bit ripple-through counter which provides simultaneous frequency division by two and eight on the $Q_B$ and $Q_D$ outputs, respectively. The counting operation occurs on the negative transition on the clock input. After five clock pulses or negative transitions have occurred on the clock input, the signal outputs on the $Q_B$ and $Q_D$ outputs go to a logic "high". Prior to the next low transition output-from the flip-flop 40 on the Q output thereof, there will be a logic "high" output therefrom to the third input of the three input NAND gate 60. When all three inputs are at a logic "high", the output thereof will be a logic "low". This logic state will persist until the output signal from the Q output of the flip-flop 40 changes to a logic "low".

The output of the three input NAND gate 60 is connected to one input of a two input AND gate 61. The second input of the two input AND gate 61 is connected to the Power-up Clear (PUC) signal. The output of the two input AND gate 61 is connected to the clear input of a D-type flip-flop 62. The D-type flip-flop 62 has the clock input thereof connected to the output of a three input AND gate 64 and the D input thereof connected to a positive voltage reference "+V", which is representative of a logic "high". The three input AND gate 64 has one input thereof connected to an $\overline{ENABLE}$ signal, one input thereof connected to the output of the inverter 48 for the ALATCH signal and the third input thereof connected to the output f an OR gate 66. When the $\overline{ENABLE}$ signal, the ALATCH signal and the output of the OR gate 66 are all at a logic "high" state, the output of the AND gate 64 changes to a logic "high" state. When either one of three input signals returns to a logic "low" state, the output of the AND gate 64 also goes to a logic "low".

The D-type flip-flop 62 clocks through the logic "high" level from the data input to the Q output thereof. Once the logic "high" state is clocked from the data input to the Q output, the Q output will remain at a logic "high" until the signal on the clear input changes states from a logic "high" to a logic "low". As described above, this occurs when the three inputs of the three input NAND gate 60 are at a logic "high". For these three inputs to be in a logic "high" state, the five bit counter must cycle five times. When the clear input on the D-type flip-flop 62 is a logic "low", the Q output thereof changes states to the logic "low" state and remains there until the clear input is at a logic "high" level and a positive transition occurs on the clock input thereof.

A bistable latch 68 and the data input thereon is connected to the Q output of the J-K flip-flop 36 and the gate input thereof connected to the output of a NAND gate 70. The Q output thereof is connected to the input of a buffer 71 to provide the CLK signal which is connected to the clock input of the CPU 12. The latch 68 is a transparent latch that is controlled by the signal on the gate inpu thereof. When the signal on the gate input is at a logic "high", the logic signal on the data input appears on the Q output. When the gate is at a logic "low", the logic state on the Q output remains at the logic state that was present with a logic "high" on the gate input.

The NAND gate 70 has one input thereof connected to the $\overline{Q}$ output of the J-K flip-flop 40 and the other input thereof connected to the Q output of the D-type flip-flop 62. As described above, the Q output of the D-type flip-flop 62 will be at a logic "high" when a clock signal is received on the input thereof and will remain in that state until the counter 38 and flip-flop 40 complete five complete cycles. For that duration of time, the output of the NAND gate 70 will be at a logic "high" each time the $\overline{Q}$ output of the flip-flop 40 is at a logic "low". Since the flip-flop 40 is clocked by the 5 MHz clock, the width of the output pulse on the Q output thereof is equal to one full cycle of the 5 MHz clock. Therefore, the latch 68 will become "transparent" only during the period of time that the $\overline{Q}$ output of the flip-flop 40 is a logic "low" and then for only one cycle of the 5 MHz clock. Since the occurrence of a logic "low" on the $\overline{Q}$ output of the flip-flop 40 occurs only once for every count cycle programmed into the counter 38, only one transition of the 2.5 MHz clock output from the J-K flip-flop 36 will pass through to the Q output of the latch 68. To ensure that the $\overline{Q}$ output of the flip-flop 40 does not make a transition that coincides with a transition on the 2.5 MHz clock, the J-K flip-flop 36 shifts the leading edge of the 2.5 MHz signal one-half cycle of the 5 MHz clock. Since the gate input for the latch 68 coincides with the leading edge of the 5 MHz clock, the gate will always be "transparent" prior to the occurrence of either a leading or trailing edge of the 2.5 MHz clock. Therefore, simultaneous transitions at the data and gate inputs of the latch 68 which can result in an error, are prevented.

The OR gate 58 has one input thereof connected to the output of the inverter 34 to receive the inverted 5 MHz signal and the other input thereof connected to the output of an AND gate 72. The AND gate 72 has one input thereof connected to the Q output of the D-type flip-flop 62 and the other input thereof connected to the $\overline{IDLE}$ signal. As will be described hereinbelow, the $\overline{IDLE}$ signal occurs when it is desirable to have the CPU 12 running continuously in the slow state. The counter 56 only counts when the clear input is at a logic "high". During the counting operation described above, the Q output of the D-type flip-flop 62 is at a logic "high". When the $\overline{IDLE}$ signal is also at a logic "high", the output of the AND gate 72 is at a logic "high" resulting in a logic "high" in the output of the OR gate 58. However, when the $\overline{IDLE}$ signal is at a logic "low", the output of the AND gate 72 goes to a logic "low" and the OR gate 58 is controlled by the 5 MHz clock signal output from the inverter 34 resulting in a 5 MHz output signal from the OR gate 58. The 5 MHz signal on the clear input of the counter 56 continually resets the $Q_B$ and $Q_D$ outputs to a logic "low", thereby keeping the output of the three input NAND gate 60 at a logic "high". This logic "high" on the output of the three input NAND gate 60 prevents the clear input of the D-type flip-flop 62 from resetting the Q output thereof to a logic "low". Until the Q output thereof is reset to a logic "low", the NAND gate 70 will continue to be operated by the $\overline{Q}$ output of the flip-flop 40 resulting in a CLK signal that operates at a lower frequency than the 2.5 MHz signal input to the latch 68.

The clocking operation of the counter 38 and the flip-flop 40 is controlled by the NAND gate 50. One input of the NAND gate 50 is connected to the output of the buffer circuit 32 and the other input thereof is connected to the Q output of the D-type flip-flop 62. Therefore, the counter 38 and the flip-flop 40 will be clocked only during the presence of a logic "high" on the Q output of the flip-flop 62, which occurs when a clock signal is input thereto as a result of the presence of the $\overline{ENABLE}$ signal, the ALATCH signal and a logic "high" on the output of the OR gate 66.

The IDLE signal is generated by the CPU 12 when it is desirable to have the CLK signal output from the latch 68 operating at a lower frequency than the 2.5 MHz signal output by the flip-flop 36. The IDLE signal is input to one input of the OR gate 66 and the other input of the OR gate 46 with the inverted IDLE signal input to the AND gate 72. When the IDLE signal is a logic "high", the outputs of the OR gate 46 and the OR gate 66 are also at a logic "high". The logic "high" on the output of the OR gate 46 maintains the clear input of the counter 38 at a logic "high" for continuous counting. The logic "high" on the output of the OR gate 66 maintains the third input of the three input AND gate 64 at the same level such that the $\overline{ENABLE}$ signal and the ALATCH signal control the clocking operation of the D-type flip-flop 62. In addition, the $\overline{IDLE}$ signal will be a logic "low" when the IDLE signal is a logic "high" to prevent the counter 56 from counting to five, thus preventing the occurrence of a clear signal on the clear input of the D-type flip-flop 62. As described above, this places the gating operation of the latch 68 under control of the flip-flop 40 until a clear signal is input to the D-type flip-flop 62.

During the operation of the CPU 12, various numbers of peripheral devices called chips are selectively addressed. To accomplish this, the CPU 12 generates an address which is decoded to create a Chip Enable Signal that determines which particular chip is being accessed. In the preferred embodiment, a slow clock signal can also be generated in conjunction with the Chip Enable Signal such that the rate of the clocking operation for the CPU 12 is reduced at the same time that a particular chip or peripheral device is enabled. These chip enable signals and slow clock signals are input to a gate array network 74 which is input to the other input of the OR gate 66. The gate array 74 includes an AND gate 76, an AND gate 78, and an AND gate 80. The input of the AND gate 76 has a slow clock signal SRSC connected to one input thereof and a Chip Enable Signal $\overline{CE6}$ connected to the other input thereof through an inverter 82.

The AND gate 78 has a slow clock signal ESC1 connected to one input thereof and a Chip Enable Signal $\overline{CE4}$ connected to the other input thereof through an inverter 84. The AND gate 80 has a slow clock signal ESC2 connected to one input thereof and a Chip Enable Signal $\overline{CE5}$ connected to the other input thereof through an inverter 86. An OR gate 88 has one input thereof connected to the output of the AND gate 76 and the other input thereof connected to a Chip Enable Signal CE1 signal through an inverter 90. An OR gate 92 has one input thereof connected to the output of the AND gate 78 and the other input thereof connected to the output of the AND gate 80. An OR gate 94 has one input thereof connected to the output of the OR gate 88 and the other input thereof connected to the output of the OR gate 92 and the output thereof connected to the input of the OR gate 66.

The gate array 74 is operable to provide a logic "high" output from the OR gate 66 when the output of either the AND gate 76, the AND gate 78 or the AND gate 80 is a logic "high" or if the $\overline{CE1}$ signal is present. In order for any of the AND gates 76, 78 and 80 to have a logic "high" output, the Chip Enable Signals on the inputs thereof must be a logic "low" and the slow clock signal must be a logic "high". In this state the slow clock mode for the CPU 12 can be initiated by the $\overline{ENABLE}$ signal and the ALATCH signal which are input to the three input AND gate 64. For example, if the signal $\overline{CE4}$ is a logic "low" and the ESCI signal is a logic "high", a logic "high" is input to the OR gate 92 rsulting in a logic "high" level input to the OR gate 94, resulting in a logic "high" input to the OR gate 66. The purpose of the AND gate 78 is to allow the rate of the CPU 12 clock input CLK signal to be "software" controlled. That is, the particular chip or peripheral being enabled can be enabled in either the fast or the slow mode, depending upon the logic state of the slow clock signal.

In the preferred embodiment, the LCD controller 22 is controlled by the $\overline{CE1}$ signal. Whenever the LCD controller 22 is accessed, the Chip Enable Signal CE1 is generated. Since this signal by itself will provide a logic "high" on the output of the OR gate 66, only the $\overline{EN}$ $\overline{ABLE}$ and ALATCH signals are then necessary to control initiation of the slow clock cycle. Other peripheral devices controlled by the CPU 12 and associated with the $\overline{CE4}$, $\overline{CE5}$ or $\overline{CE6}$ signals require the generation of a slow clock signal in addition to the Chip Enable Signal to allow the $\overline{ENABLE}$ and ALATCH signals to initiate the slow clock cycle. In this manner, different peripheral devices can be utilized with different speeds.

The slow clock signals in combination with the Chip Enable Signals allow the clock to operate at either a 2.5 MHz rate or a lower rate depending upon the values of CO-C2. As described above, the rate is software programmable such that the values of CO-C2 are variable. These values are made available to the control circuit 24 through the use of a 4 bit READ/WRITE Clock Control Register. The first three bits of this register are the binary values of CO-C2 and the fourth bit is the logic state of the IDLE signal. By addressing the Clock Control Register, the values of CO-C2 are input to the counter 38. The possible bit combinations and the frequency of the CLK signal are shown in the following table.

| C2 | C1 | C0 | Division Factor | Slow Clock Speed (MHz) |
|---|---|---|---|---|
| 0 | 0 | 0 | 17 | 0.147 |

-continued

| C2 | C1 | C0 | Division Factor | Slow Clock Speed (MHz) |
|---|---|---|---|---|
| 0 | 0 | 1 | 15 | 0.167 |
| 0 | 1 | 0 | 13 | 0.192 |
| 0 | 1 | 1 | 11 | 0.227 |
| 1 | 0 | 0 | 9 | 0.278 |
| 1 | 0 | 1 | 7 | 0.357 |
| 1 | 1 | 0 | 5 | 0.500 |
| 1 | 1 | 1 | 3 | 0.833 |

Figure 3B:
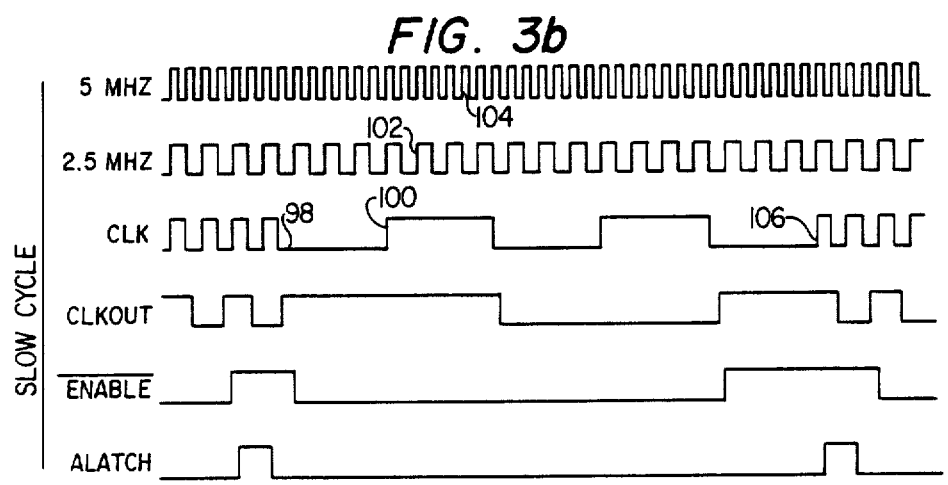
Figure 3C:
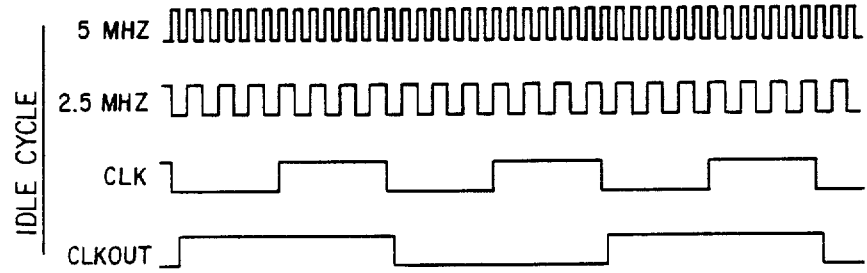

Referring now to FIGS. 3a-c, there are illustrated various timing diagrams for the operation of the clock generator 26 and a clocking operation for the CPU 12. FIG. 3a illustrates the timing diagram for the normal cycle which allows the CPU 12 to operate at its maximum rate. A 5 MHz waveform represents the signal output from the clock generator 26 and a 2.5 MHz waveform represents the output from the flip-flop 36 in the circuit of FIG. 2. The output of the clock control circuit 24 of FIG. 2 is the CLK signal which is represented by the CLK waveform. In the normal cycle, the CLK waveform is identical to the 2.5 MHz waveform since the latch 68 is open at all times. A CLKOUT signal is also illustrated which is the signal that is output by the TMS 7000 series Microprocessor utilized in the preferred embodiment. The CLKOUT signal is provided for illustrative purposes only and is not utilized in controlling the operation of the present invention.

FIG. 3b illustrates the 5 MHz, 2.5 MHz, CLK and CLKOUT waveforms during operation of the slow cycle in which the clock rate to the CPU 12 is reduced. In addition, an $\overline{\text{ENABLE}}$ waveform and an ALATCH waveform are also illustrated which are representative of the $\overline{\text{ENABLE}}$ and ALATCH signals, respectively. With further reference to the circuit of FIG. 2, the operation of the slow cycle will be described in detail. Although not shown, the gate array 74 must be activated prior to operating the slow cycle.

When one of the AND gates 76, 78 and 80 has a logic "high" on the input thereof or the $\overline{\text{CEI}}$ signal is present, the output of the OR gate 66 will be a logic "high", thereby allowing the initiation of the slow cycle to be determined by the $\overline{\text{ENABLE}}$ and ALATCH signals. When the $\overline{\text{ENABLE}}$ signal is a logic "high" and the ALATCH signal changes states from a logic "low" to a logic "high", a transition occurs on the output of the three input AND gate 64, thereby clocking the output of the D-type flip-flop 62 to a logic "high". This initiates the counter 38 by allowing the 5 MHz clock to pass through the NAND gate 50. In addition, the ALATCH signal also presets the Q output of the flip-flop 40 to a logic "low". The next positive transition from the NAND gate 50, inverted by the inverter 52, will clock the flip-flop and change the $\overline{Q}$ output of the flip-flop 40 to a logic "high". Therefore, there are two logic "high" signals on the input of the NAND gate 70, causing the transparent latch 68 to be closed and the logic state on the Q output is retained until the latch 68 is opened. In the CLK waveform of FIG. 3b, this point in time is represented by a point 98 at which the logic state on the Q output of the transparent latch 68 is a logic "low".

As described above, the transparent latch 68 remains in the closed position until the counter 38 and flip-flop 40 provide an output signal on the $\overline{Q}$ output thereof. This duration of time is determined by number of 5 MHz clock cycles that must be counted by the counter 38 and flip-flop 40 to provide this output. The counter 38 begins counting at the preset number that is loaded into the counter 38 when the flip-flop 40 is preset by the ALATCH signal. This is a four bit number of which three bits are latched over from the CPU 12 and the fourth bit of which is provided by the ground on the A data input. Upon reaching the maximum count, the $\overline{Q}$ output of flip-flop 40 changes from a logic "high" to a logic "low" which causes the output of the NAND gate 70 to change to a logic "high", thereby opening the transparent latch 68 and allowing the logic state on the data input thereof to pass through to the Q output thereof.

The counting sequence of the counter 38 and the flip-flop 40 is synchronous with respect to the 5 MHz clock which is inverted by the NAND gate 50. Therefore, the rising edge of the output of the NAND gate 70 will always coincide with the rising edge of the 5 MHz clock signal. As described above, however, the 2.5 MHz signal always makes the transition on the negative transition of the 5 MHz clock. Therefore, the transparent latch 68 will always be gated at least one-half cycle of the 5 MHz clock prior to any transition on the 2.5 MHz clock.. The result is that the gating function of the transparent latch 68 will not occur at the same time that a transition occurs on the 2.5 MHz clock, thereby preventing the possibility of a "glitch" occurring in the CLK signal. This is illustrated by a positive transition 100 on the CLK waveform in FIG. 3b which corresponds to a positive transition 102 on the 2.5 MHz waveform.

After the counter 38 and the flip-flop 40 have completed five counting cycles, the counter 56 outputs a logic "high" on the $Q_B$ and $Q_D$ outputs thereof. This causes the output of the three input NAND gate 60 to change from a logic "high" to a logic "low", thereby setting the Q output of the D-type flip-flop 62 to a logic "low". This opens the transparent latch 68 and inhibits the counting procedure through the NAND gate 50. The transparent latch 68 will remain open until the D-type flip-flop 62 is again clocked by the combined presence of an $\overline{\text{ENABLE}}$ signal, an ALATCH signal and a logic "high" on the output of the OR gate 66. The counter 56 is designed to count five counts out of the flip-flop 40 before clearing the D-type flip-flop 62. This is represented by point 106 on the CLK waveform. The first four counts allow for the slow peripheral access time. The fifth count allows additional time for the slow peripheral to remove its signals from the bus before the CPU 12 puts the next address on the same lines.

The five bit counter 56, counter 38 and flip-flop 40, will always count an odd number of counts. In this manner, when latch 68 is opened the D input thereof will always be at the same logic level as the Q output thereof was left at the time when the latch 68 was previously closed. This is another precaution taken to prevent the possibility of a "glitch" occurring in the CLK signal.

Referring now to FIG. 3c, there are illustrated waveforms representative of the "idle" mode. As can be seen, the CLK signal is operating at a lower frequency which is continuous. As described above, this is due to the continual resetting of the counter 56 by the 5 MHz clock signal input to the OR gate 58. Since the IDLE signal causes the one input of the OR gate 58 to occupy a logic "low" state, the output of the OR gate 58 is controlled by the 5 MHz clock signal on the other input thereof. The CLK signal will continue in the "idle" mode until the IDLE signal is removed.

In summary, a microprocessor clock control circuit is provided which is software controlled which can selectively slow the clock that is input to the microprocessor. This enables the microprocessor to selectively address different peripheral devices at different speeds. In this manner, low speed, less expensive peripheral devices can be coupled with high speed peripheral devices in the same microprocessor-based system. The microprocessor can selectively control its clock frequency and operate up to the maximum speed of the selected peripheral device.

In the preferred embodiment, the components that are utilized are as follows:

| Description | Ref Numeral | Part No | Manufacturer |
|---|---|---|---|
| J-K flip-flop | 36 | 74111 | Texas Instruments |
| J-K flip-flop | 40 | 74111 | Texas Instruments |
| Counter | 38 | 74161 | Texas Instruments |
| Counter | 56 | 74197 | Texas Instruments |
| D-type flip-flop | 62 | 7474 | Texas Instruments |
| Latch | 68 | 7475 | Texas Instruments |

Although the preferred embodiment has been described in detail, it should be understood that various changes, substitutions and alterations can be made therein without departing from the spirit and scope of the invention as defined by the appended claims.

What is claimed is:

1. A microprocessor-based system comprising:
a digital central micrprocessor provided with a clock input and having a rate of operation determined by the frequency of a clock signal input thereto;
memory means operably coupled to said central microprocessor for storing programs respectively including a plurality of instructions and addressable by said central microprocessor;
a first peripheral device operably connected to said central microprocessor, said first peripheral device being addressable by said central microprocessor for control thereby and capable of operating at a first maximum rate of operation when addressed by said central microprocessor which at least equals the maximum rate of operation of said central microprocessor;
a second peripheral device operably connected to said central microprocessor, said second peripheral device being addressable by said central microprocessor for control thereby and capable of operating at a second maximum rate of operation when addressed by said central microprocessor which is less than the maximum rate of operation of said central microprocessor;
a system clock generator for generating a digital reference clock signal having a reference frequency rate; and
frequency rate reduction circuit means connected between said clock generator and the clock input of said central microprocessor for selectively dividing said reference clock signal to generate a microprocessor clock signal as an input to said central microprocessor for clocking said central microprocessor at a normal clock signal having a first frequency rate reduced as compared to the frequency rate of the reference clock signal or a second frequency rate of reduced frequency relative to the first frequency rate of said normal clock signal, said central microprocessor when clocked at said first frequency rate controlling said first peripheral device at or below said first maximum rate of operation therefor and when clocked at said second frequency rate controlling said second peripheral device at or below said second maximum rate of operation therefor; and
said frequency rate reduction circuit means being controlled by said central microprocessor in response to instructions stored in said memory means in selecting the frequency rate of the clock signal input to said central microprocessor.

2. A microprocess-based system comprising:
a central microprocessor for controlling the system;
means for generating a reference clock signal having a fixed reference frequency rate;
means operably connected to said reference clock signal-generating means for reducing the frequency of the reference clock signal to provide a normal clock signal having a reduced frequency rate as compared to the frequency rate of the reference clock signal, said frequency-reducing means being operably coupled to a clock input of said central microprocessor to selectively clock said central microprocessor at the frequency of said normal clock signal or at a frequency lower than the frequency of said normal clock signal such that the execution speed of said central microprocessor may be varied independence upon a particulate system function to be controlled; and
said frequency-reducing means including a programmable divider circuit having means for controlling a duration period during which the frequency of said normal clock signal is divided to a lower frequency than that of said normal clock signal by said divider circuit, the clocking frequency of said central microprocessor automatically returning to the frequency of said normal clock signal at the end of the duration period.

3. A micrprocessor-based system comprising:
a central micrprocessor for controlling the system;
a first peripheral device interfacing with said central microprocessor for control thereby and having a first maximum rate of operation;
a second peripheral device interfacing with said central microprocessor for control thereby and having a second maximum rate of operation less than said first maximum rate;
a clock generator for generating a digital output signal having a predetermined reference frequency and serving as a reference clock signal;
said central microprocessor having an input for receiving a digital clock signal as a microprocessor clock signal and being operated under the control thereof;
dividing means operably coupled to said clock generator for reducing the frequency of the reference clock signal output therefrom to provide a clock signal having a reduced frequency rate as compared to the frequency rate of the reference clock signal to the input of said central microprocessox, said dividing means being programmable to select the frequency rate at which said central microprocessor is clocked for clocking said central microprocessor at either a first or second frequency rate, said central microprocessor when clocked at said first frequency rate controlling said first peripheral device at or below said first maximum rate of operation therefor and when clocked at said second frequency rate controlling said second peripheral device at or below said second maximum rate of operation therefor; and system memory means operably connected to said dividing means and having execution commands for controlling said dividing means, said dividing means being responsive to execution commands from said system memory means to select the frequency rate at which said central microprocessor is clocked.

4. Apparatus for varying the execution rate of a microprocessor in a microprocessor-based system by changing the frequency of a clock signal input thereto to enable the microprocessor interface with differnet peripheral devices having different maximum rates of operation, said apparatus comprising:

a clock generator for generating a reference clock signal having a fixed reference frequency rate;

frequency rate reduction circuit means operably coupled to said clock generator for reducing the frequency of the reference clock signal output therefrom to provide a clock signal having a reduced frequency rate as compared to the frequency rate of the reference clock signal for input to the microprocessor;

latch circuit means having first and second input and an output, the first input of said latch circuit means being connected to receive said clock signal from said frequency rate reduction circuit means and the output thereof adapted to be connected to the clock input of the microprocessor, said latch circuit means being operable to become transparent in response to a gating signal received by the second input thereof;

a counting circuit operably coupled to said clock generator and to said second input of said latch circuit means for generating said gating signal after counting a predetermined number of cycles of the reference clock signal, said counting circuit initiating a count cycle only after generation of said gating signal;

said counting circuit generating said gating signal to cause said latch cirucit means to become transparent during selected transitions of said clock signal; and means operably coupled to said second input of said latch circuit means and to said counting circuit and responsive to initiation of the count cycle for overriding said counting circuit to make said latch circuit means independent of said counting circuit.

5. The apparatus of claim 4 wherein said overriding means comprises an event counter circuit for counting the number of cycles of said counting circuit and overriding said counting circuit to generate said gating signal after a predetermined number of count cycles has occurred.

6. The apparatus of claim 4 wherein said counting circuit is programmable by the microprocessor to provide the number of counts therefor.

7. The apparatus of claim 4 wherein said counting circuit generates said gating signal prior to the occurrence of the transition of the clock signal and when the output logic level of said latch circuit means is equal to the input logic level of the first input of said latch circuit means, said gating signal being terminated after the transition from one logical level to the other by the clock signal such that intiation of said gating signal does not coincide with a transition on the clock signal.

8. A microprocessor-based system comprising:

a central micrprocessor for controlling the system, said central microprocessor having a clock input for receiving a microprocessor clock signal and being operated under the control thereof;

a first peripheral device interfacing with said central microprocessor for control thereby and having a first maximum rate of operation;

a second peripheral device interfacing with said central microprocessor for control thereby and having a second maximum rate of operation less than said first maximum rate;

a clock generator for generating a reference clock signal having a predetermined reference frequency;

means operably coupled to said clock generator and to said central microprocessor for selectively dividing said reference clock signal to generate a micrprocessor clock signal as an input to said central microprocessor for clocking said central microprocessor at either a first frequency rate serving as the normal frequency rate of the clock signal or a second frequency rae reduced below the normal frequency rate of the clock signal, said central microprocessor when clocked at said first frequency rate of the clock signal controlling said first peripheral device at or below said first maximum rate of operation therefor, and when clocked at said second frequency rate controlling said second peripheral device at or below said second maximum rate of operation therefor;

said selective dividing means including frequency rate reduction circuit means operably connected to said clock generator for reducing the frequency rate serving as the normal frequency rate of the clock signal, latch circuit means having first and second inputs and an output, the first input of said latch circuit means being connected to receive said clock signal from said frequency rate reduction circuit means and the output thereof connected to the clock input of said central microprocessor, said latch circuit means being operable to become transparent in response to a gating signal received by the second input thereof, gating means coupled to said second input of said latch circuit means for generating a gating signal to gate said latch circuit means, said gating means maintaining the logic state of the clock signal in said latch circuit means until a new logic state is gate thereto, and counting means operably coupled to said clock generator and to said second input of said latch circuit means via said gating means for counting a predetermined number of cycles of said reference clock signal as generated by said clock generator to gate said gating means after said predetermined number of cycles have been counted, said counting means gating said gating means only at transitions of said reference clock signal; and said selective dividing means further including variably programmable means for selecting any one of a plurality of frequency rates including said first frequency rate serving as the normal frequency rate of the clock signal and a plurality of different frequency rates reduced below the normal frequency rate of the clock signal to provide the frequency rate at which said central microprocessor is clocked.

9. A microprocessor-based system as set forth in claim 8 wherein said counting means gates said gating means prior to a logic transition on said normal clock signal and when the level of said normal clock signal equals the output signa level of said gating means, such that gating of said gating means does not cause a logic transition on the output thereof.

10. A microprocessor-based system as set forth in claim 8 wherein said central microprocessor is provided with a set of interface lines operably connected to said counting means, and said central microprocessor generating signals along said interface lines effective to control the initiation of said counting means from count "0" and the number of cyoles of said clock generator that said counting means counts.

11. A microprocessor-based system as set forth in claim 8, wherein said variably programmable means of said selective dividing means comprises a plurality of interface lines provided by said central microprocessor for delivering respective binary signals representative of a plurality of different frequency rates lower than said first frequency rate serving as the normal frequency rate of the clock signal, one of said lower frequency rates being selected as said second frequency rate and being represented by corresponding binary signals on said plurality of interface lines; and said counting means comprising a counter device having a plurality of inputs connected to said interface lines rom said central micrprocessor for respectively receiving binary signals at said plurality of inputs identifying a selected programmed frequency rate as said second frequency rate of the microprocessor clock signal at which said central micrprocessor is clocked.

12. A microprocessor-based system as set forth in claim 8, wherein said selective dividing means further includes duration means operably coupled to said gating means for maintaining the output of said gating means in a logic state closing said latch circuit means for a duration of time determined by the counting of cycles of said reference clock signal by said counting means for a preset number of cycles of said reference clock signal, such that said central microprocessor is clocked at a lower frequency rate than the frequency rate of said normal clock singal for a predetermined duration of time, the duration of time being independent of the central microprocessor.

* * * * *